(12) United States Patent
Gottschalk et al.

(10) Patent No.: US 11,591,096 B1
(45) Date of Patent: Feb. 28, 2023

(54) ARTIFICIAL ICE FOR AN AIRCRAFT COMPONENT

(71) Applicant: Raytheon Technologies Corporation, Farmington, CT (US)

(72) Inventors: David E. Gottschalk, West Hartford, CT (US); Isaac J. Hogate, Farmington, ME (US); Christina M. Williams, Coventry, CT (US); Shane C. Hilton, Tolland, CT (US); Neill E. Brown, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/396,076

(22) Filed: Aug. 6, 2021

(51) Int. Cl.
*B64D 27/10* (2006.01)
*B64F 5/60* (2017.01)
*F02C 7/00* (2006.01)

(52) U.S. Cl.
CPC ............... *B64D 27/10* (2013.01); *B64F 5/60* (2017.01); *F02C 7/00* (2013.01); *F05D 2220/323* (2013.01); *F05D 2260/81* (2013.01); *F05D 2260/83* (2013.01)

(58) Field of Classification Search
CPC .... B64F 5/60; F05D 2260/81; F05D 2260/83; F05D 2220/323; F02C 7/00; B64D 27/10
See application file for complete search history.

(56) References Cited

U.S. PATENT DOCUMENTS

| | | | |
|---|---|---|---|
| 4,526,031 A * | 7/1985 | Weisend, Jr | B64D 15/20 73/147 |
| 6,279,856 B1 * | 8/2001 | Rutherford | B64D 15/14 244/134 R |
| 7,157,663 B1 * | 1/2007 | Kismarton | B64D 15/14 219/548 |
| 9,696,238 B2 | 7/2017 | Bosetti | |
| 10,696,412 B2 * | 6/2020 | Mackin | B64D 15/02 |
| 10,759,517 B2 * | 9/2020 | Leopold | B64D 15/00 |
| 10,870,491 B2 * | 12/2020 | Reissig | B64D 15/04 |
| 11,125,157 B2 * | 9/2021 | Thomas | F02C 7/045 |
| 11,371,838 B2 * | 6/2022 | Jara Rodelgo | G01B 11/30 |
| 2012/0241561 A1 * | 9/2012 | Sham | F02C 7/047 60/39.093 |
| 2014/0070054 A1 * | 3/2014 | Burton | H01L 51/0048 219/202 |
| 2015/0183530 A1 * | 7/2015 | Strobl | B32B 37/1284 156/60 |
| 2016/0076968 A1 * | 3/2016 | Bosetti | G01M 17/00 428/141 |
| 2016/0245175 A1 * | 8/2016 | Clarkson | F02C 7/047 |
| 2016/0347451 A1 * | 12/2016 | Shepshelovich | B64C 39/024 |
| 2021/0063147 A1 * | 3/2021 | Jara Rodelgo | B64F 5/60 |
| 2022/0080277 A1 * | 3/2022 | Cupa | A63B 67/14 |

FOREIGN PATENT DOCUMENTS

| | | |
|---|---|---|
| CN | 111351630 A | 6/2020 |
| CN | 212639554 U * | 3/2021 |
| WO | 2019056030 A1 | 3/2019 |

* cited by examiner

*Primary Examiner* — Craig Kim

(74) *Attorney, Agent, or Firm* — Getz Balich LLC

(57) ABSTRACT

An assembly is provided for an aircraft propulsion system. This aircraft propulsion system assembly includes an aircraft propulsion system component with a leading edge. The aircraft propulsion system assembly also includes artificial ice attached to the aircraft propulsion system component. The artificial ice at least partially covers and extends longitudinally along the leading edge.

20 Claims, 11 Drawing Sheets

ARTIFICIAL ICE FOR AN AIRCRAFT COMPONENT

BACKGROUND OF THE DISCLOSURE

1. Technical Field

This disclosure relates generally to an aircraft and, more particularly, to simulating ice accumulation on a component of the aircraft.

2. Background Information

During certain conditions, various components of an aircraft may be subject to ice accumulation thereon. There is a need in the art to better understand effects of ice accumulation on an aircraft component.

SUMMARY OF THE DISCLOSURE

According to an aspect of the present disclosure, an assembly is provided for an aircraft propulsion system. This aircraft propulsion system assembly includes an aircraft propulsion system component with a leading edge. The aircraft propulsion system assembly also includes artificial ice attached to the aircraft propulsion system component. The artificial ice at least partially covers and extends longitudinally along the leading edge.

According to another aspect of the present disclosure, an assembly is provided for an aircraft. This aircraft assembly includes an aircraft component with a leading edge. The aircraft assembly also includes artificial ice attached to the aircraft component. The artificial ice at least partially covers and extends longitudinally along the leading edge. The artificial ice is configured with a hollow body.

According to still another aspect of the present disclosure, a method is provided involving an aircraft propulsion system. During this method, artificial ice is attached to a component of the aircraft propulsion system. The artificial ice at least partially covers and extends longitudinally along a leading edge of the component of the aircraft propulsion system. One or more operational parameters of the aircraft propulsion system are monitored while the artificial ice is attached to the component of the aircraft propulsion system.

The artificial ice may be attached to the aircraft component with single sided tape.

The artificial ice may be configured for ingestion by a turbine engine without damaging the turbine engine.

The assembly may also include an inlet structure to a turbine engine of the aircraft propulsion system. The inlet structure may include a plurality of inlet vanes. The aircraft propulsion system component may be configured as or otherwise include a first of the plurality of inlet vanes.

The artificial ice may be attached to the aircraft propulsion system component with tape.

The tape may include an intermediate portion between a first end portion and a second end portion. The intermediate portion may extend about and may be adhered to an exterior surface of the artificial ice. The first end portion may extend along and may be adhered to a first side surface of the aircraft propulsion system component. The second end portion may extend along and may be adhered to a second side surface of the aircraft propulsion system component.

The artificial ice may directly contact the aircraft propulsion system component.

The artificial ice may be configured with a hollow body.

The artificial ice may include an outer shell and a support. The outer shell may form an internal cavity within the artificial ice. The support may project across the internal cavity between opposing sides of the outer shell.

The artificial ice may include a fracture feature.

The artificial ice may include a base, a first side leg and a second side leg. The base may be laterally between the first side leg and the second side leg. The base may extend longitudinally along and may cover the leading edge. The first side leg may project out from the base along and may cover a first side surface of the aircraft propulsion system component. The second side leg may project out from the base along and may cover a second side surface of the aircraft propulsion system component.

The artificial ice may include an interior surface that extends along the base, the first side leg and the second side leg. At least a portion of the interior surface may engage the leading edge.

The artificial ice may include an interior surface that extends along the base, the first side leg and the second side leg. At least a portion of the interior surface may be disengaged from the leading edge.

At least a portion of an exterior surface of the artificial ice may have a curved, convex cross-sectional geometry as the portion of the exterior surface wraps about the aircraft propulsion system component from a first trailing edge of the artificial ice to a second trailing edge of the artificial ice.

At least a portion of an exterior surface of the artificial ice may have a cross-sectional geometry as the portion of the exterior surface wraps about the aircraft propulsion system component from a first trailing edge of the artificial ice to a second trailing edge of the artificial ice. The cross-sectional geometry may include a concave section and a convex section.

The artificial ice may have a cross-sectional geometry. The cross-sectional geometry may change as the artificial ice extends longitudinally along the leading edge.

The artificial ice may be constructed from or otherwise include brittle and/or rigid material.

The artificial ice may extend longitudinally along the leading edge between a first end of the artificial ice and a second end of the artificial ice. A portion of the artificial ice may taper inward to the aircraft propulsion system component as the portion of the artificial ice extends longitudinally along the leading edge to the first end of the artificial ice.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
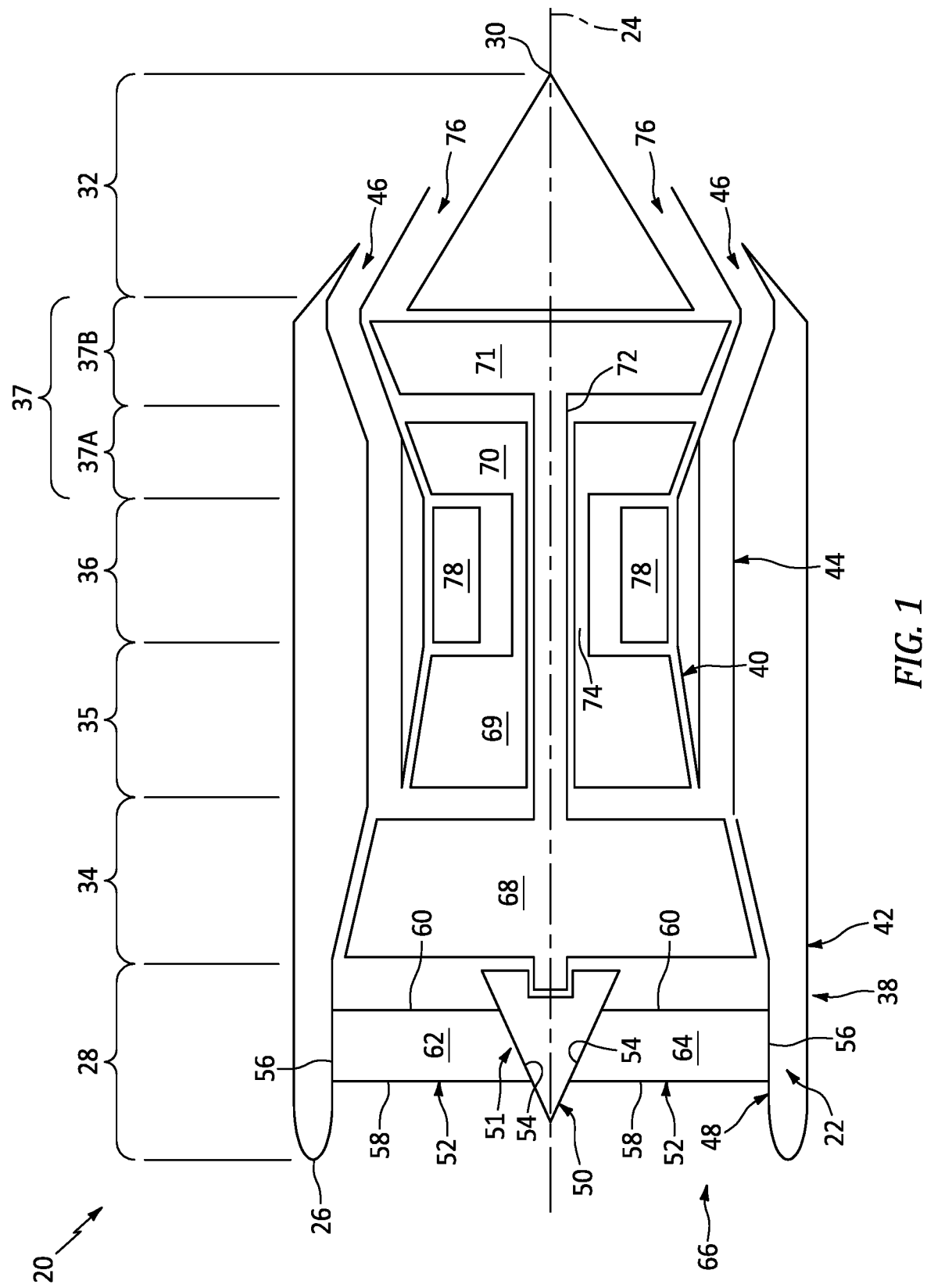
FIG. 1 is a side schematic illustration of an aircraft propulsion system.

FIG. 1 is a side schematic illustration of an aircraft propulsion system 20 with a gas turbine engine 22. This aircraft propulsion system 20 extends axially along an axial centerline 24 between and to a leading edge 26 of an inlet structure 28 and a trailing end 30 of an exhaust structure 32.

The turbine engine 22 of FIG. 1 includes a fan section 34, a compressor section 35, a combustor section 36 and a turbine section 37. The turbine section 37 includes a high pressure turbine (HPT) section 37A and a low pressure turbine (LPT) section 37B. The turbine engine 22 may also include the inlet structure 28 and the exhaust structure 32.

The engine sections 34-37B are arranged sequentially along the axial centerline 24 within an engine housing 38. This engine housing 38 includes an inner housing structure 40, an outer housing structure 42, a bypass duct 44 and the exhaust structure 32. The inner housing structure 40 is configured to house and/or support one or more components of a core of the turbine engine 22, which engine core includes the compressor section 35, the combustor section 36 and the turbine section 37. The outer housing structure 42 is configured to house and/or support the fan section 34 and the engine core. The outer housing structure 42 may also include the inlet structure 28. The bypass duct 44 is configured to form a (e.g., annular) bypass flowpath 46 that provides a bypass around (e.g., radially outside of and axially along) the engine core.

Figure 2:
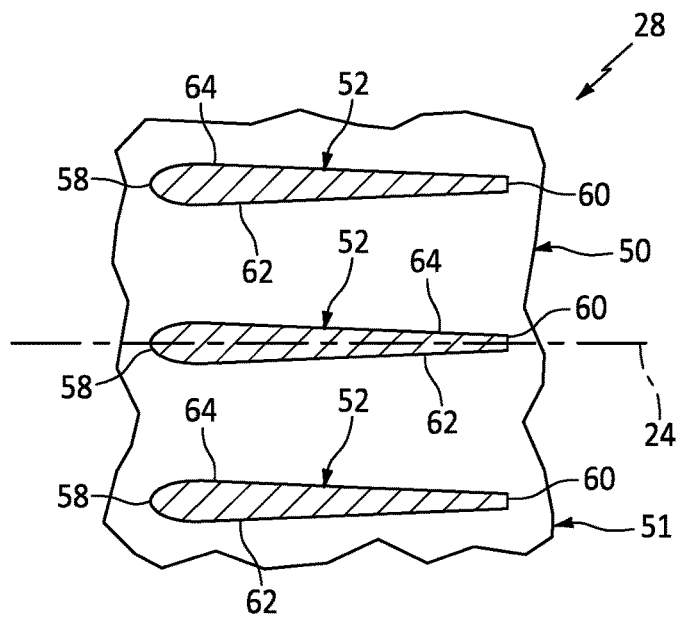
FIG. 2 is a partial sectional illustration of an inlet structure for the aircraft propulsion system.

The inlet structure 28 of FIG. 1 includes an outer platform 48 (e.g., shroud or case), and inner platform 50 (e.g., an outer case of an inlet center body 51), and one or more inlet vanes 52. The outer platform 48 extends axially along and circumferentially about (e.g., completely around) the axial centerline 24. The inner platform 50 extends axially along and circumferentially about (e.g., completely around) the axial centerline 24. The inlet vanes 52 are arranged circumferentially about the axial centerline 24 in an annular array. This array of inlet vanes 52 is located radially between the outer platform 48 and the inner platform 50. Each of the inlet vanes 52 extends radially between and to an inner end 54 of the respective inlet vane 52 and an outer end 56 of the respective inlet vane 52. The vane inner end 54 is connected to or otherwise arranged at (e.g., on, adjacent or proximate) the inner platform 50. The vane outer end 56 is connected to or otherwise arranged at the outer platform 48. Each of the inlet vanes 52 extends axially along the axial centerline 24 between a leading edge 58 of the respective inlet vane 52 and a trailing edge 60 of the respective inlet vane 52. Referring to FIG. 2, each of the inlet vanes 52 extends laterally (e.g., circumferentially or tangentially) between opposing side surfaces 62 and 64 of the respective inlet vane 52. Referring to FIG. 1, the inlet vanes 52 may be configured to structurally support the inlet center body 51. The inlet vanes 52 of FIG. 1 may also or alternatively condition air directed to the fan section 34 from a forward, upstream airflow inlet 66 of the aircraft propulsion system 20.

Each of the engine sections 34, 35, 37A and 37B of FIG. 1 includes a respective rotor 68-71. Each of these rotors 68-71 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 68 is connected to and driven by the LPT rotor 71 through a low speed shaft 72. The compressor rotor 69 is connected to and driven by the HPT rotor 70 through a high speed shaft 74. The shafts 72 and 74 are rotatably supported by a plurality of bearings (not shown), which bearings may be connected to the engine housing 38 by at least one stationary structure such as, for example, an annular support strut.

During operation, air enters the turbine engine 22 through the airflow inlet 66 and the inlet structure 28. This air is directed through the fan section 34 and into a (e.g., annular) core flowpath 76 and the bypass flowpath 46. The core flowpath 76 extends sequentially through the engine sections 35-37B. The air within the core flowpath 76 may be referred to as "core air". The bypass flowpath 46 may be referred to as "bypass air".

The core air is compressed by the compressor rotor 69 and directed into a (e.g., annular) combustion chamber 78 of a (e.g., annular) combustor in the combustor section 36. Fuel is injected into the combustion chamber 78 and mixed with the compressed core air to provide a fuel-air mixture. This fuel air mixture is ignited and combustion products thereof flow through and sequentially cause the HPT rotor 70 and the LPT rotor 71 to rotate. The rotation of the HPT rotor 70 drives rotation of the compressor rotor 69 and, thus, compression of the air received from a core airflow inlet. The rotation of the LPT rotor 71 drives rotation of the fan rotor 68, which propels some air into the core airflow inlet and some air through the bypass flowpath 46.

Under certain environmental conditions, one or more or all of the leading edges 58 of the inlet vanes 52 may be susceptible to ice accumulation. The inlet structure 28 may therefore be configured with a thermal anti-icing system (not shown) for heating the vane leading edges 58 and/or adjacent portions of the vane side surfaces 62 and 64 (see FIG. 2). To better understanding effects of leading edge ice accumulation, performance requirements for the thermal anti-icing system and/or whether the thermal anti-icing system is needed at all for aircraft propulsion system operation, the present disclosure includes methods and apparatuses for simulating leading edge ice accumulation and monitoring effects of the leading edge ice accumulation on aircraft propulsion system operation.

Figure 3:
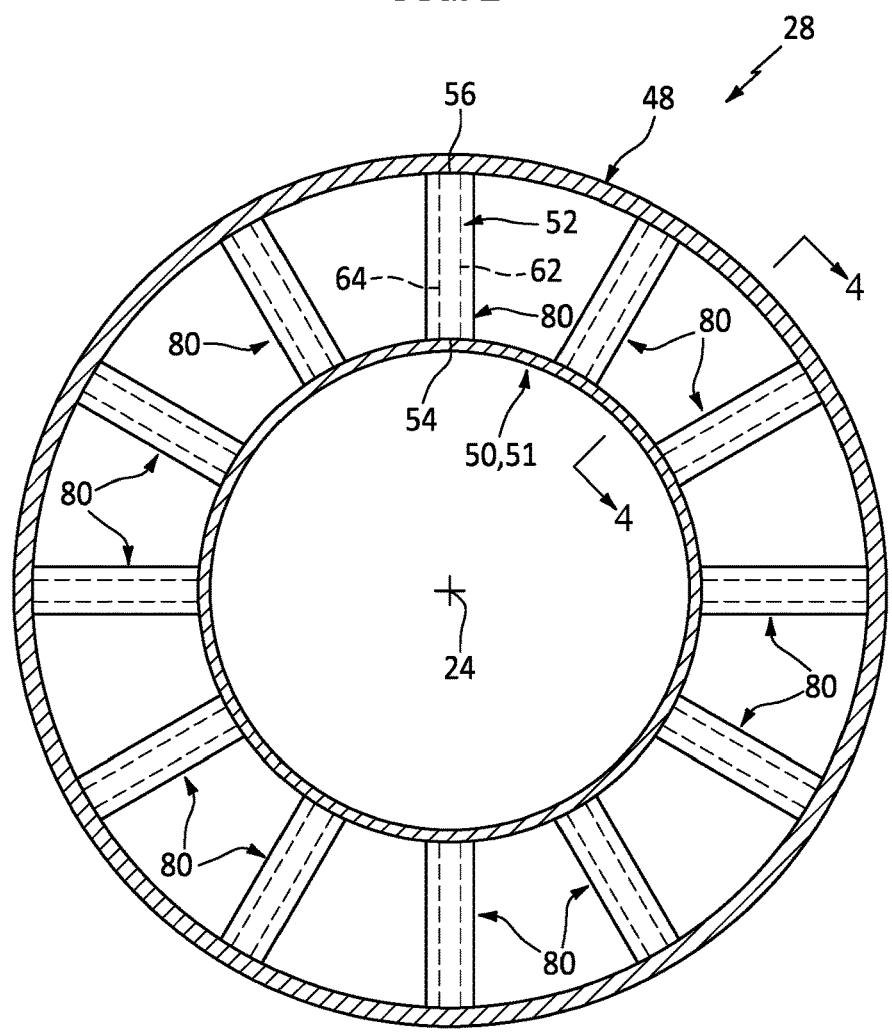
FIG. 3 is a cross-sectional illustration of the inlet structure configured with artificial ice.
Figure 4:
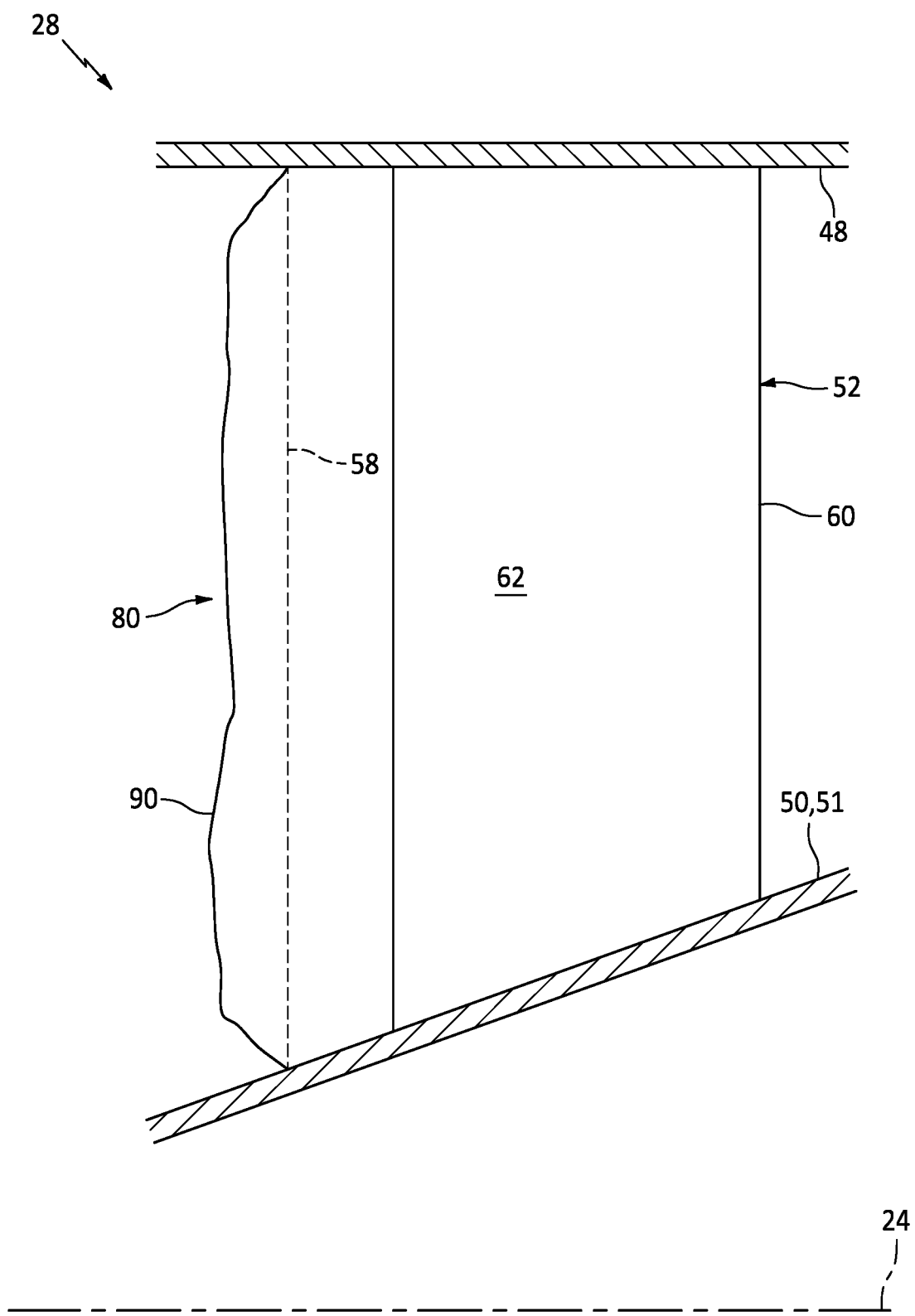
FIG. 4 is a side sectional illustration of the inlet structure configured with the artificial ice taken along line 4-4 in FIG. 3.

FIGS. 3 and 4 illustrate the aircraft propulsion system and, more particularly, its inlet structure 28 configured with one or more pieces of artificial ice 80, which may also be referred to as ice shapes. Each piece of artificial ice 80 is arranged with a respective one of the inlet vanes 52. Each piece of artificial ice 80, for example, at least partially or completely covers and extends longitudinally along the leading edge 58 of the respective inlet vane 52. Each piece of artificial ice 80 is (e.g., temporarily) attached to the respective inlet vane 52.

Figure 5:
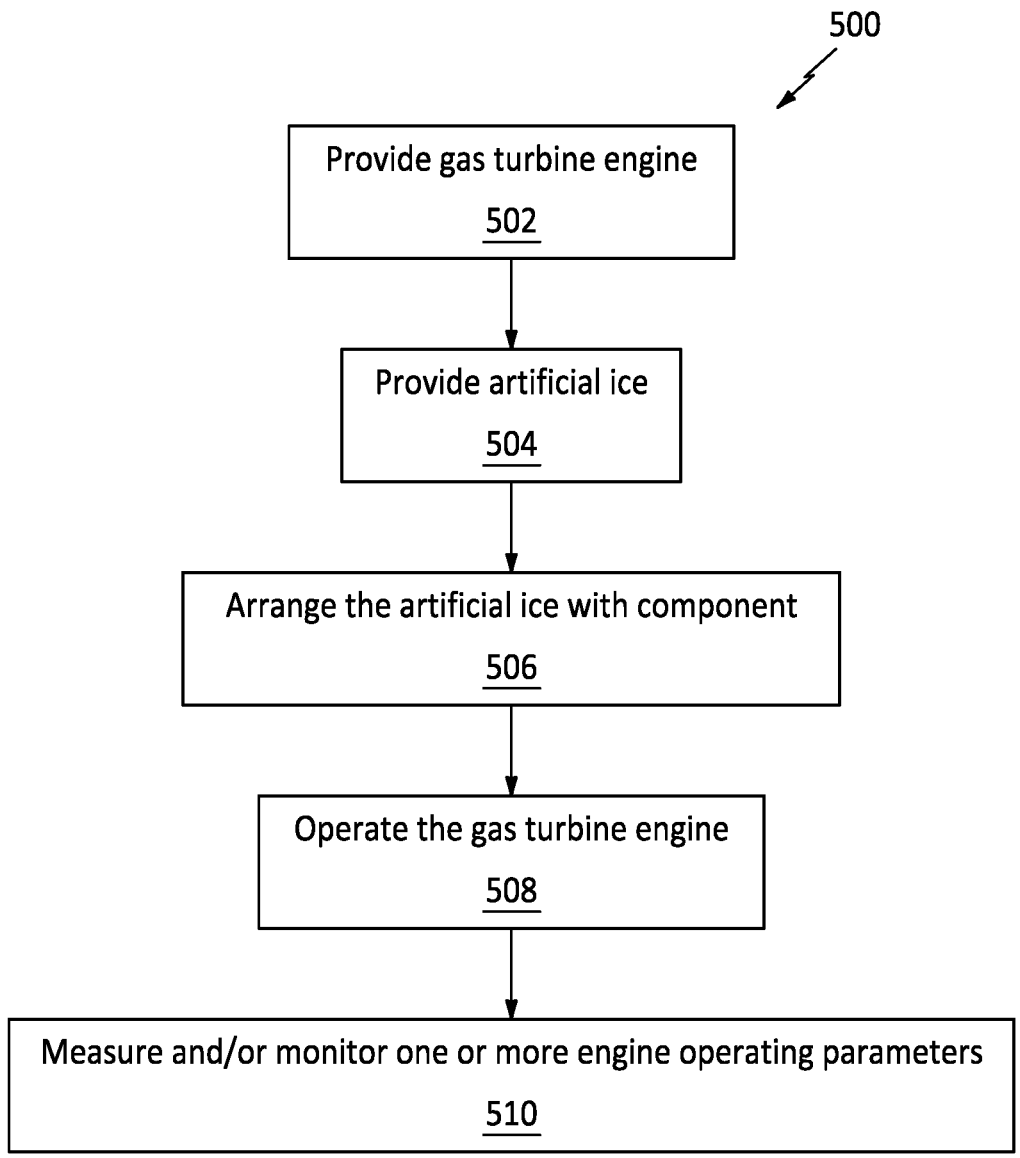
FIG. 5 is a flow diagram of a method for simulating and/or monitoring icing conditions for an aircraft propulsion system.

FIG. 5 is a flow diagram of a method 500 for simulating and/or monitoring icing conditions for an aircraft propulsion system. For ease of description, the method 500 is described below with reference to the aircraft propulsion system 20 and the artificial ice 80 described above. The method 500, however, may also be performed to simulate and/or monitor icing conditions in various other aircraft propulsion systems and/or using artificial ice with various other configurations, some non-limiting examples of which are described below in further detail.

In step 502, at least a portion (e.g., without some or all of its nacelle) or an entirety of the aircraft propulsion system 20 is provided. The turbine engine 22, for example, may be provided and mounted to a test stand.

In step 504, the artificial ice 80 is provided.

In step 506, the artificial ice 80 is arranged with at least one component of the aircraft propulsion system 20. Each piece of the artificial ice 80, for example, may be arranged with and attached to a respective one of the inlet vanes 52. Once attached to the inlet vane 52, the respective piece of artificial ice 80 may simulate (e.g., have a general form of) ice accumulation on the leading edge 58 of that inlet vane 52. For example, rather than attempting to reproduce a test environment that would form actual ice accumulation on the inlet structure 28 and its inlet vanes 52, the artificial ice 80 is designed to have predicted configurations (e.g., geometries) of the actual ice accumulation. However, the artificial ice 80 is made from a material that is solid at room temperature such that the effects of ice accumulation may be reproduced with a standard engine test facility.

In step 508, the turbine engine 22 is operated at one or more operating states. These operating states may include, but are not limited to, low thrust operation, normal thrust operation associated with, for example, aircraft cruise, and high thrust operation.

In step 510, one or more parameters of turbine engine operation are measured and monitored to determine, for example, the effects of the ice accumulation simulated by the artificial ice 80. Based on the determined ice accumulation effects, the thermal anti-icing system for the aircraft propulsion system 20 may be tuned to enhance de-icing and/or to enhance energy efficiency. The thermal anti-system may alternatively be omitted from the aircraft propulsion system 20 where, for example, it is determined that the effects of ice accumulation on the inlet structure 28 are negligible or can be overcome by altering turbine engine operation (e.g., increasing thrust, etc.) during icing conditions.

Figure 6:
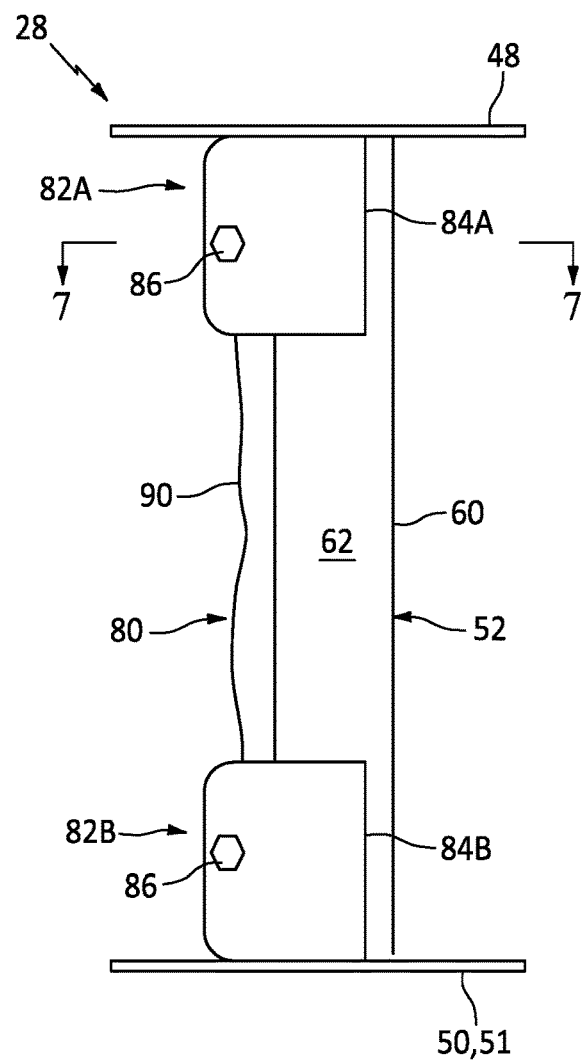
FIG. 6 is a side schematic illustration of the artificial ice being install with an inlet vane using installation tools.
Figure 7:
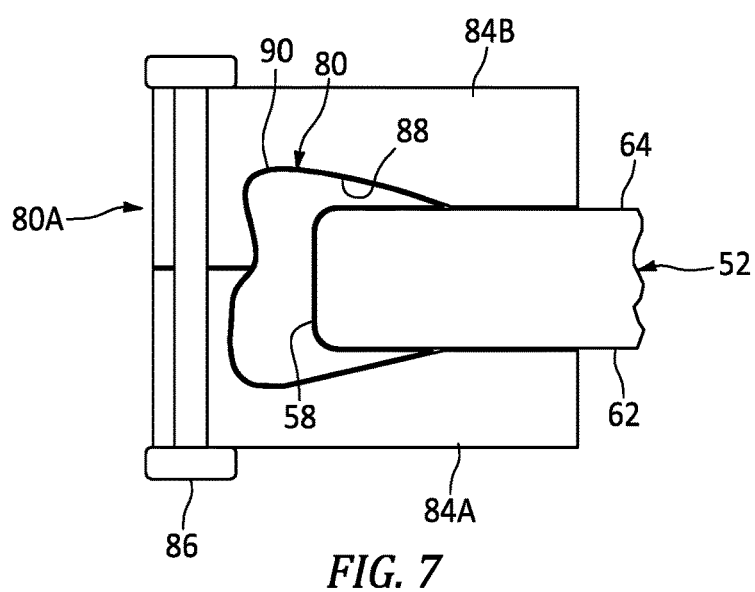
FIG. 7 is a sectional schematic illustration of the artificial ice being install with the inlet vane using the installation tools.

In some embodiments, referring to FIGS. 6 and 7, the artificial ice 80 may be installed with the inlet structure 28 and its inlet vanes 52 using one or more installation tools 82A and 82B (generally referred to as "82"). Each installation tool 82 of FIGS. 6 and 7 includes a first segment 84A (e.g., half) and a second segment 84B (e.g., half). These installation tool segments 84A and 84B (generally referred to as "84") are connected together to hold the artificial ice 80 to the respective inlet vane 52 during attachment. The installation tool segments 84, for example, may be secured (e.g., mechanically fastened) together via at least one fastener assembly 86 (e.g., a bolt and a wing nut) so as to clamp the artificial ice 80 onto the respective inlet vane 52. Each installation tool 82 and its respective segments 84 may be specifically tailored with an interior engagement surface 88 that closely or exactly matches an exterior surface 90 of the artificial ice 80 (generally shown in FIG. 7 for ease of illustration). Each installation tool 82 may also be specifically tailored to be positioned adjacent and/or engage another portion of the turbine engine 22. The outer installation tool 82A of FIG. 6, for example, is configured to abut against the outer platform 48. The inner installation tool 82B of FIG. 6 is configured to abut against the inner platform 50. The installation tools 82 may therefore precisely and repeatably locate the artificial ice 80 with the respective inlet vane 52.

Figure 8:
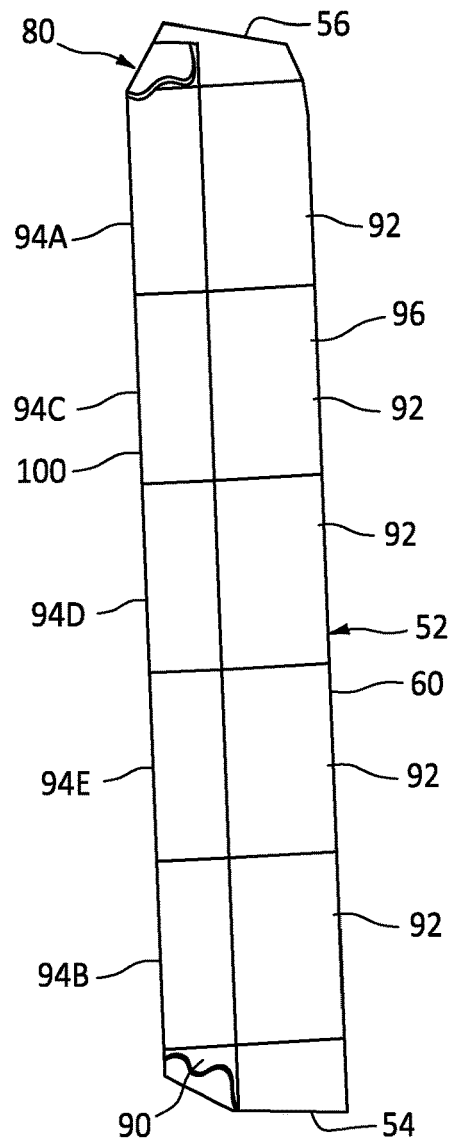
FIG. 8 is a partial perspective illustration of the artificial ice attached to the inlet vane with tape.
Figure 9:
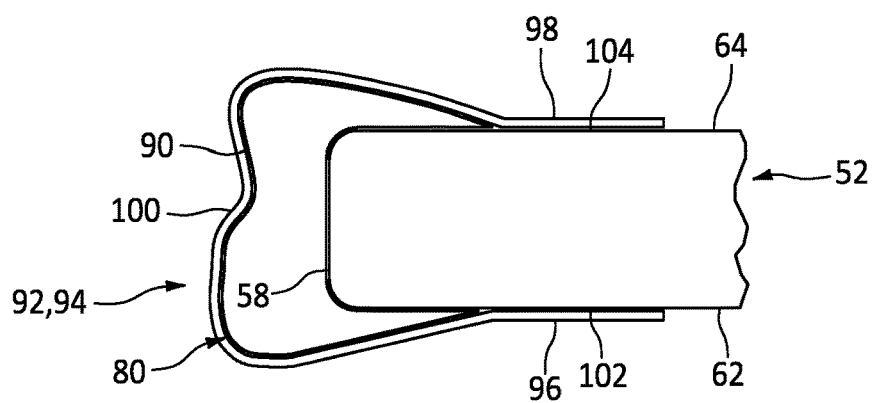
FIG. 9 is a sectional schematic illustration of the artificial ice attached to the inlet vane with the tape.

In some embodiments, referring to FIGS. 8 and 9, the artificial ice 80 may be attached to the inlet structure 28 and its inlet vanes 52 using (e.g., one-sided, single-sided) tape 92. Each piece of artificial ice 80 of FIGS. 8 and 9, for example, is (e.g., temporarily) attached to the respective inlet vane 52 with one or more pieces 94A-E (generally referred to as "94") (e.g., discrete segments, lengths, etc.) of the tape 92. Some of the tape pieces 94 (e.g., radially intermediate tape pieces 94C-E) may be applied while the artificial ice 80 is held by the installation tools 82; e.g., see FIG. 6. The remaining tape piece(s) (e.g., radially inner and outer tape pieces 94A and 94B) may be applied after the installation tools 82 are removed; e.g., see FIG. 8.

Each piece 94 of the tape 92 may include one or more portions. Each piece 94 of the tape 92 of FIGS. 8 and 9, for example, includes a first end portion 96, a second end portion 98 and an intermediate portion 100 between the first end portion 96 and the second end portion 98. More particularly, each piece 94 of the tape 92 extends between and to a first end of the tape piece 94 and a second end of the tape piece 94. The first end portion 96 is located at the first end of the tape piece 94. The second end portion 98 is located at the second end of the tape piece 94. The intermediate portion 100 extends between and to the first end portion 96 and the second end portion 98.

The first end portion 96 of FIG. 9 projects out from the intermediate portion 100 and overlaps a portion 102 of the first side surface 62 of the respective inlet vane 52 to a first side of the vane leading edge 58. The first end portion 96 extends (e.g., along a chord of the respective inlet vane 52 and/or axially relative to the axial centerline 24) along the first side surface portion 102. The first end portion 96 is attached (e.g., directly adhered) to the first side surface portion 102.

The second end portion 98 of FIG. 9 projects out from the intermediate portion 100 and overlaps a portion 104 of the second side surface 64 of the respective inlet vane 52 to a second side of the vane leading edge 58. The second end portion 98 extends (e.g., along the chord of the respective inlet vane 52 and/or axially relative to the axial centerline 24) along the second side surface portion 104. The second end portion 98 is attached (e.g., directly adhered) to the second side surface portion 104.

The intermediate portion 100 of FIG. 9 wraps about the artificial ice 80 and its exterior surface 90. The intermediate portion 100, more particularly, extends along, covers and overlaps the artificial ice 80 and its exterior surface 90 as the intermediate portion 100 extends between and to the first end portion 96 and the second end portion 98. The intermediate portion 100 is attached (e.g., directly adhered) to the artificial ice 80 and its exterior surface 90.

With the foregoing arrangement, each tape piece 94 is external to/outside of the artificial ice 80 and the respective inlet vane 52. The artificial ice 80 therefore may be abutted (e.g., directly) against the respective inlet vane 52 and its leading edge 58 without, for example, an intermediate adhesive and/or other materials therebetween. Furthermore, flow of air towards and around the tape 92 may serve to push the tape 92 against the artificial ice 80 and the respective inlet vane 52. Thus, the flow of the air may help to maintain the tape 92 adhesion to the artificial ice 80 and the respective inlet vane 52. The present disclosure, however, is not limited to the foregoing exemplary attachment technique.

Figure 10:
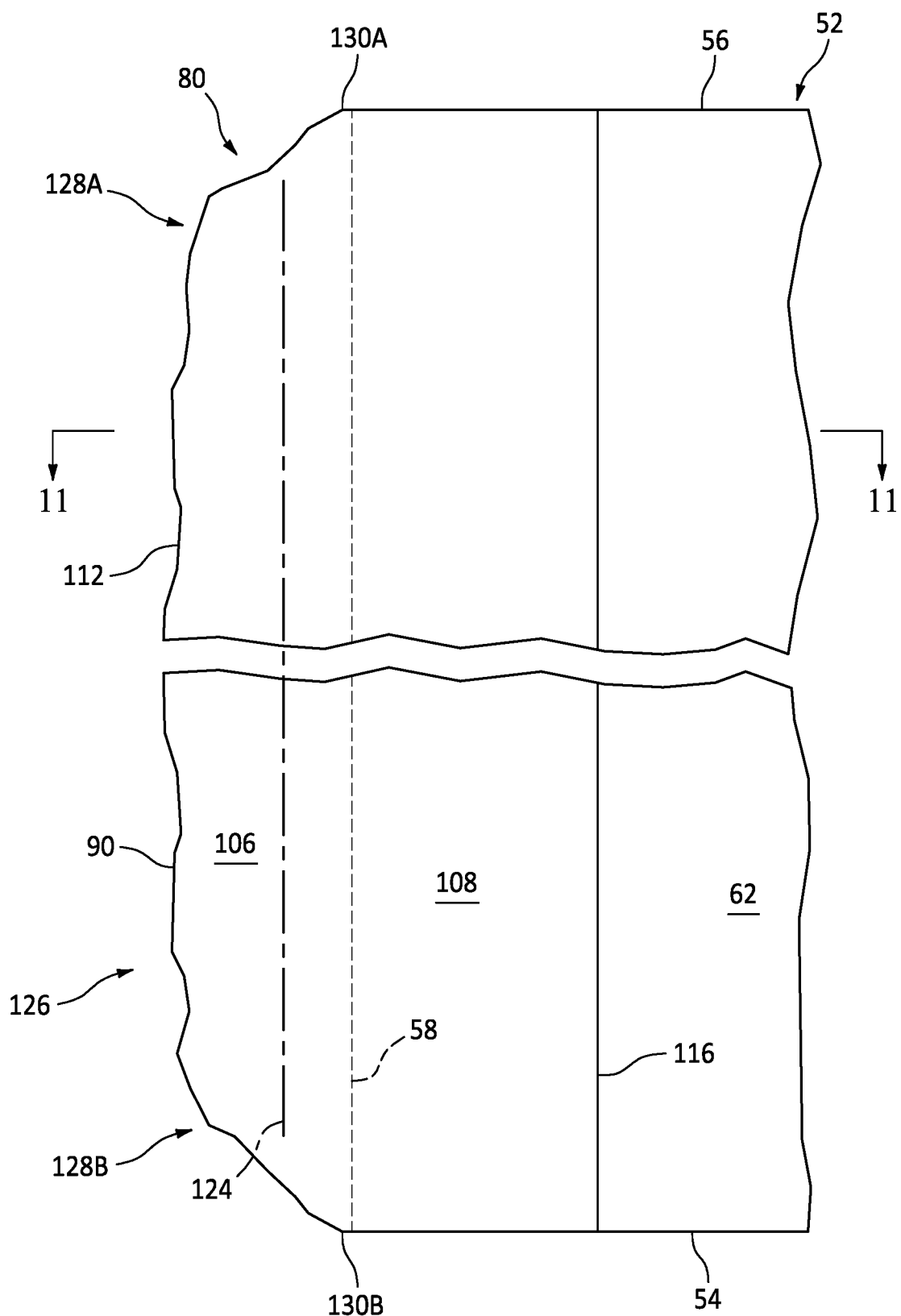
FIG. 10 is a partial side illustration of the artificial ice configured with the inlet vane.
Figure 11:
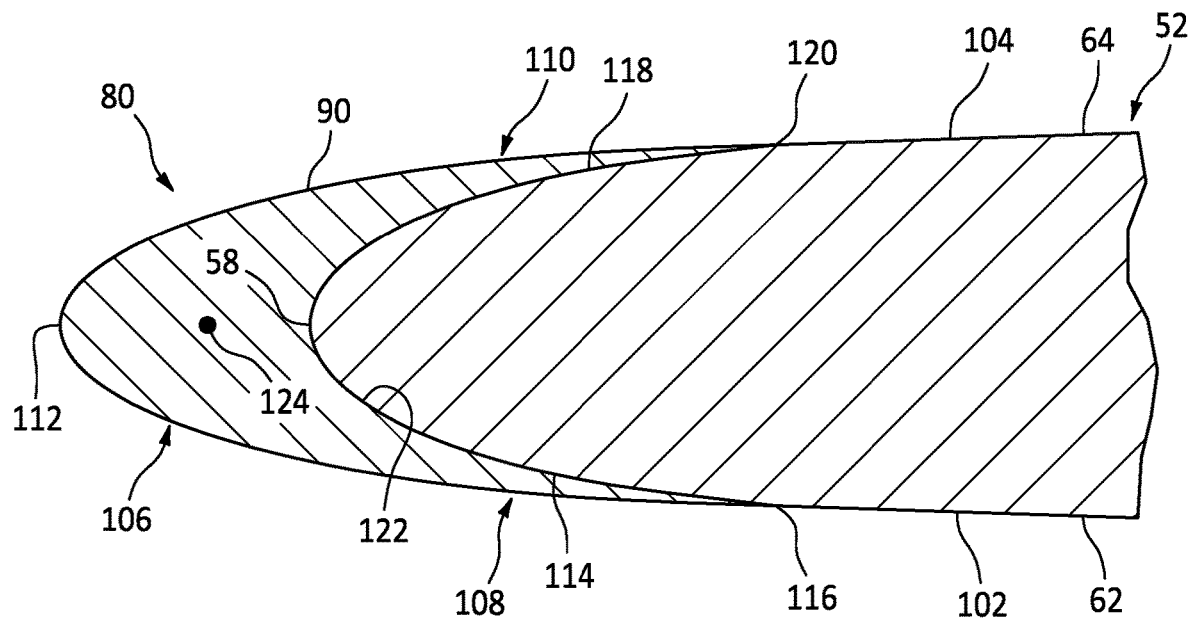
FIG. 11 is a sectional illustration of the artificial ice and the inlet vane taken along line 11-11 in FIG. 10.

Referring to FIGS. 10 and 11, the artificial ice 80 is configured to mate with and conform to the respective inlet vane 52 along its leading edge 58. The artificial ice 80 of FIGS. 10 and 11, for example, includes an artificial ice base 106, an artificial ice first side leg 108 and an artificial ice second side leg 110.

The base 106 is arranged laterally between and is connected to the first side leg 108 and the second side leg 110. The base 106 is configured to form a leading edge 112 of the artificial ice 80. The base 106 also extends longitudinally along and at least partially or completely covers the vane leading edge 58.

The first side leg 108 of FIG. 11 is located at a first side of the base 106. The first side leg 108 projects from the base 106 (e.g., along the chord of the respective inlet vane 52 and/or axially relative to the axial centerline 24) and covers another portion 114 of the first side surface 62 of the respective inlet vane 52, which first side surface portion 114 is between the other first side surface portion 102 and the vane leading edge 58. The first side leg 108 of FIG. 11 laterally tapers as the first side leg 108 projects out form the base 106, along the first side surface 62, to a first trailing edge 116 of the artificial ice 80—a distal end/edge of the first side leg 108.

The second side leg 110 of FIG. 11 is located at a second side of the base 106. The second side leg 110 projects from the base 106 (e.g., along the chord of the respective inlet vane 52 and/or axially relative to the axial centerline 24) and covers another portion 118 of the second side surface 64 of the respective inlet vane 52, which second side surface portion 118 is between the other second side surface portion 104 and the vane leading edge 58. The second side leg 110 of FIG. 11 laterally tapers as the second side leg 110 projects out form the base 106, along the second side surface 64, to a second trailing edge 120 of the artificial ice 80—a distal end/edge of the second side leg 110.

An interior surface 122 of the artificial ice 80 of FIG. 11 is collectively formed by the base 106, the first side leg 108 and the second side leg 110. This interior surface 122 has a concave cross-sectional geometry when viewed, for example, in a plane perpendicular to a longitudinal centerline 124 of the artificial ice 80; e.g., the plane of FIG. 11. The interior surface 122 is configured to closely match the exterior surface (e.g., 62 and 64 collectively along the leading edge 58) of the respective inlet vane 52 at its leading edge 58.

Figure 12A:
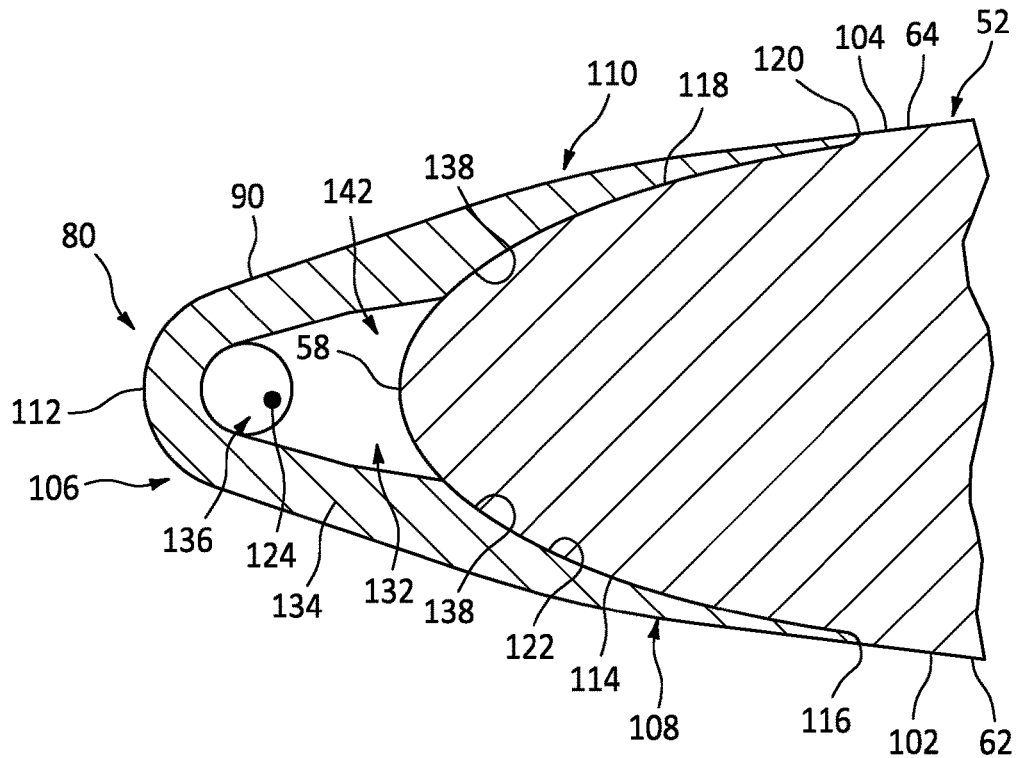
FIGS. 12A-C are sectional illustrations of various other artificial ice configurations arranged with the inlet vane.
Figure 12B:
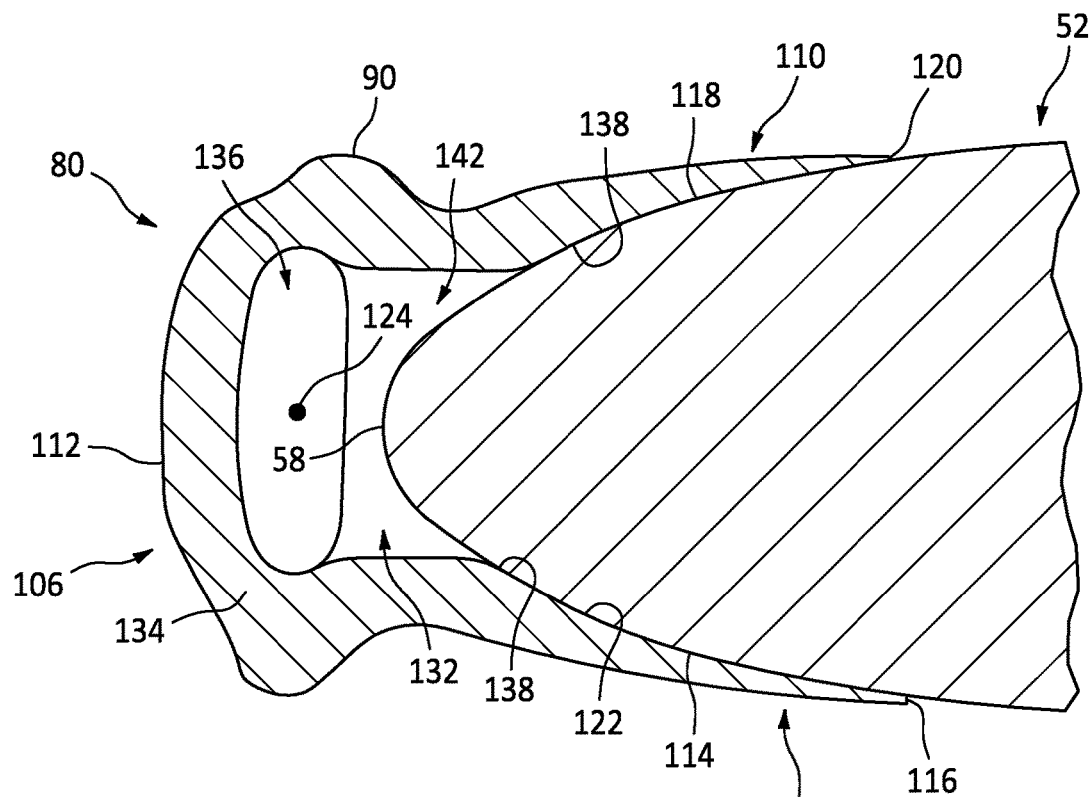
Figure 12C:
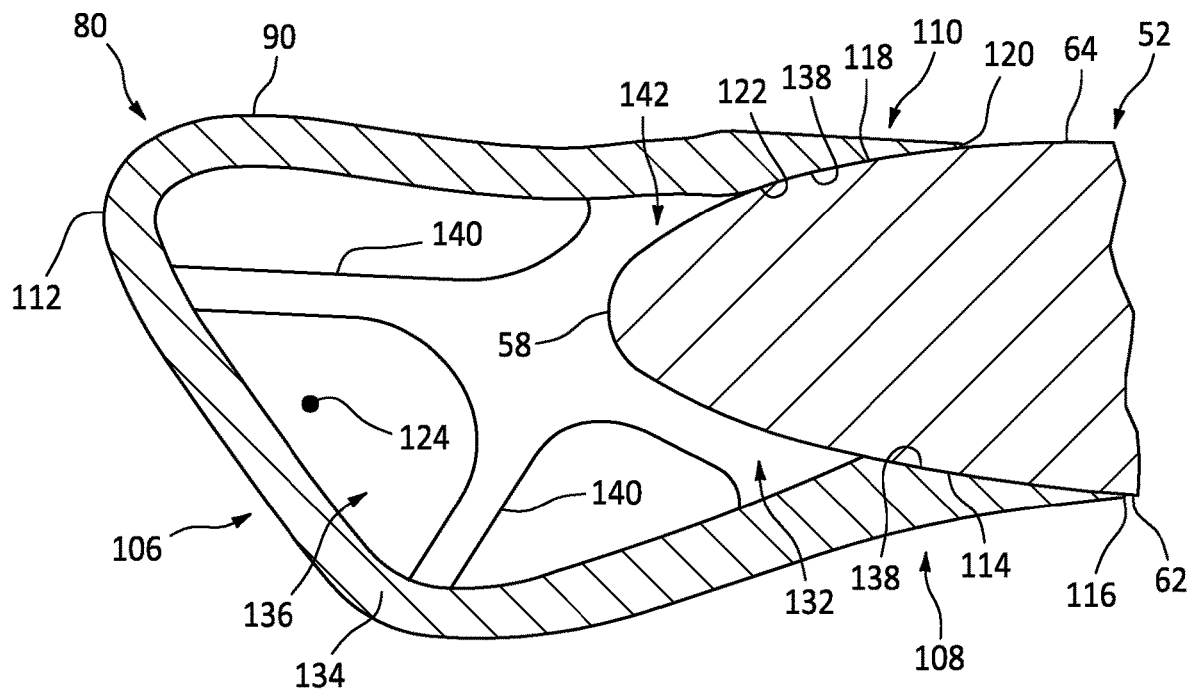

The exterior surface 90 of the artificial ice 80 of FIG. 11 is collectively formed by the base 106, the first side leg 108 and the second side leg 110. This exterior surface 90 is configured to resemble actual ice accumulation on the vane leading edge 58. The exterior surface 90, in particular, has a cross-sectional geometry when viewed, for example, in the plane perpendicular to the longitudinal centerline 124 of the artificial ice 80; e.g., the plane of FIG. 11. Referring to FIG. 12A, the exterior surface cross-sectional geometry may be (e.g., completely) curved (e.g., arcuate) and convex. Referring to FIGS. 12B and 12C, the exterior surface cross-sectional geometry may alternatively have a tortuous, undulating, wavy and/or otherwise complex shape. The exterior surface cross-sectional geometry of FIGS. 12B and 12C, for example, each include one or more convex sections and one or more concave sections when viewed in the same plane; e.g., the plane of FIG. 12B, 12C.

In some embodiments, the cross-sectional geometry of the exterior surface 90 may remain constant (the same) as at least a portion or an entirety of the artificial ice 80 extends longitudinally along the vane leading edge 58. In other embodiments, the cross-sectional geometry of the exterior surface 90 may fluctuate (e.g., change in shape and/or change in size) as at least a portion or an entirety of the artificial ice 80 extends longitudinally along the vane leading edge 58.

In some embodiments, referring to FIG. 10, the artificial ice 80 may include a longitudinal base (e.g., intermediate) portion 126 and one or more longitudinal end portions 128A and 128B (generally referred to as "128"). The longitudinal base portion 126 is arranged longitudinally between the longitudinal end portions 128. The longitudinal base portion 126 of FIG. 10 extends longitudinally along the longitudinal centerline 124 between and is connected to the longitudinal end portions 128. The cross-sectional geometry of the exterior surface 90 along this longitudinal base portion 126 may be approximately constant; of course, there may be slight changes in shape and/or changes in size. Each end portion 128 projects longitudinally out from the longitudinal base portion 126 to a respective longitudinal distal end 130A, 130B (generally referred to as "130") of the artificial ice 80. Each end portion 128 may taper as the respective end portion 128 extends longitudinally along the longitudinal centerline 124 towards or to its distal end 130. Of course, in other embodiments, one or both of these longitudinal end portions 128 may be omitted such that artificial ice 80 is not tapered at its distal ends 130.

Figure 13:
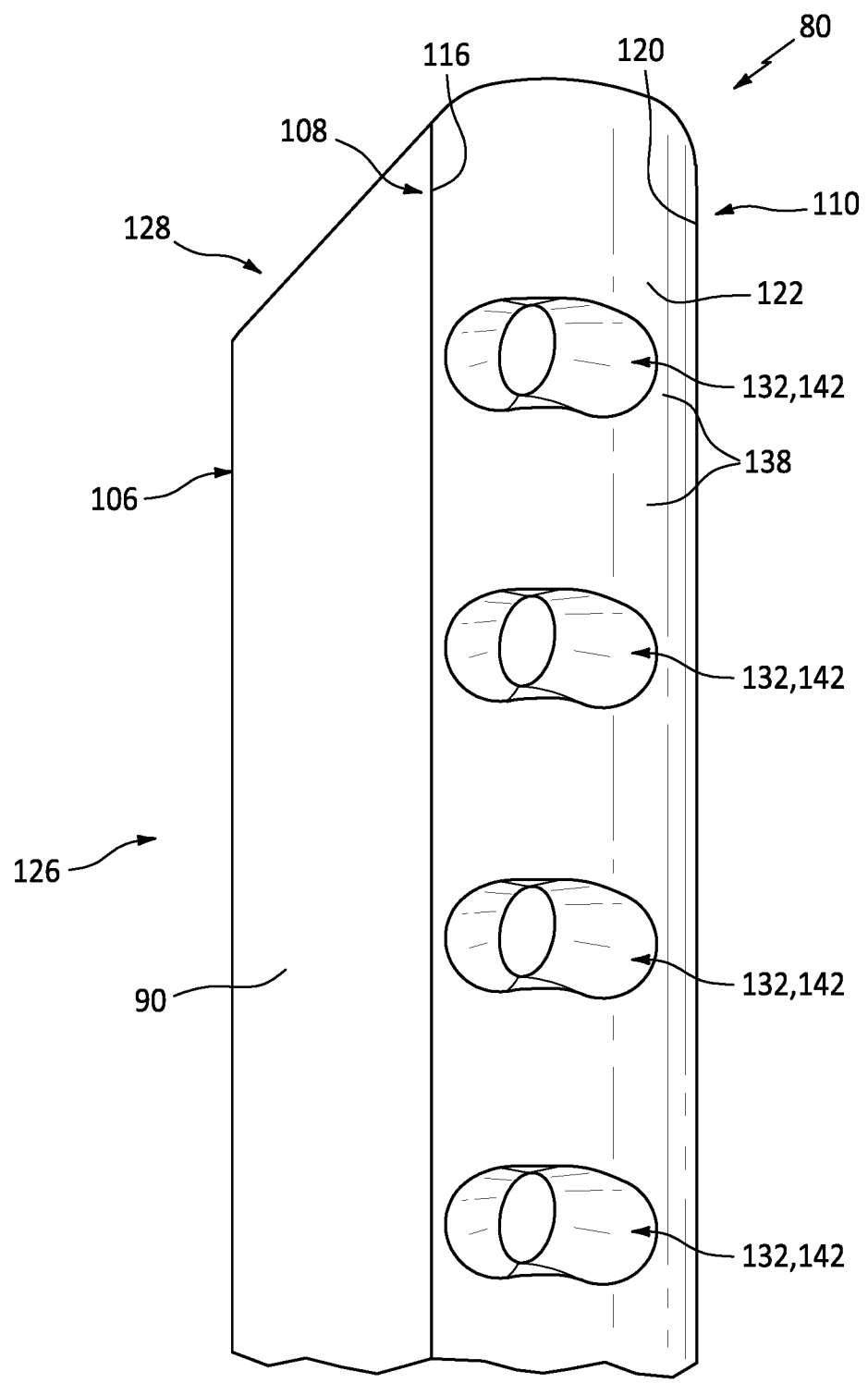
FIG. 13 is a partial perspective illustration of an interior side of the artificial ice.

In some embodiments, referring to FIGS. 12A-C, at least a portion or an entirety of the artificial ice 80 may be hollow along its longitudinal centerline 124; e.g., the artificial ice 80 may have a hollow body and/or formed from porous material such as, but not limited to, honeycomb. The artificial ice 80 of FIGS. 12A and 12B, for example, include one or more recesses 132 (see also FIG. 13). Each recess 132 projects (e.g., along the chord of the respective inlet vane 52 and/or axially relative to the axial centerline 24) partially into the artificial ice 80 and its base 106 from the interior surface 122. Each recess 132 extends laterally within the artificial ice 80 and its base 106 between opposing recess sides; e.g., sidewalls/sides of an outer shell 134 of the base 106. Each recess 132 extends longitudinally within (or into or through) the artificial ice 80 along the longitudinal centerline 124.

The artificial ice 80 of FIG. 12C includes one or more internal cavities 136 (one visible in FIG. 12C). Each internal cavity 136 is at least partially (or completely) formed by and/or bounded within the artificial ice base 106 and its outer shell 134. Each internal cavity 136 extends (e.g., along the chord of the respective inlet vane 52 and/or axially relative to the axial centerline 24) within the artificial ice 80 between and to opposing sides of the outer shell 134. Each internal cavity 136 extends laterally within the artificial ice 80 between and to opposing sides of the outer shell 134. Each internal cavity 136 extends longitudinally within (or into or through) the artificial ice 80 along the longitudinal centerline 124. The artificial ice 80 of FIG. 12C also includes one or more of the recesses 132 (see also FIG. 13), which projects into the artificial ice 80 (through the outer shell 134 adjacent the leading edge 58) to the respective internal cavity 136.

Referring to FIGS. 12A-C, the artificial ice 80 may not engage (e.g., contact) the respective inlet vane 52 along the recesses 132. Rather, the recesses 132 may provide voids (e.g., air pockets) formed by and extending between the artificial ice 80 and the respective inlet vane 52. However, portions 138 of the artificial ice 80 adjacent the recesses 132 may engage (e.g., contact) the respective inlet vane 52.

In some embodiments, referring to FIG. 12C, the artificial ice 80 may include one or more internal supports 140. These internal supports 140 may be configured to structurally stiffen or otherwise support the outer shell 134 along, for example, the exterior surface 90. Each of the internal supports 140 of FIG. 12C extends across (or may project partially into) the respective interior cavity 136. The internal support 140 of FIG. 12C may thereby divide the respective internal cavity 136 into a plurality of sub-cavities. One or more of these sub-cavities may be fluidly coupled together (e.g., interconnected), or fluidly discrete (e.g., decoupled).

In some embodiments, the artificial ice 80 may be configured as a fracturable body. The artificial ice 80, for example, may be constructed form or otherwise include brittle and/or rigid material and/or foam. Examples of the artificial ice material include, but are not limited to, polymer (e.g., thermoset or thermoplastic) or a composite thereof. Examples of the polymer may include, but are not limited to, acrylonitrile butadiene styrene (ABS) and polylactic acid (PLA). The artificial ice 80 may also or alternatively include one or more fracture features 142. Each fracture feature 142 is configured as an aperture (e.g., a recess, indentation, score, hole, etc.) or a protrusion that promotes fracturing of the artificial ice 80 when contacted by a foreign object and/or one of the engine rotors (e.g., the fan rotor 68 of FIG. 1). For example, referring to FIGS. 12A-C and 13, each fracture feature 142 may be configured as or otherwise include a respective one of the recesses 132.

Figure 14:
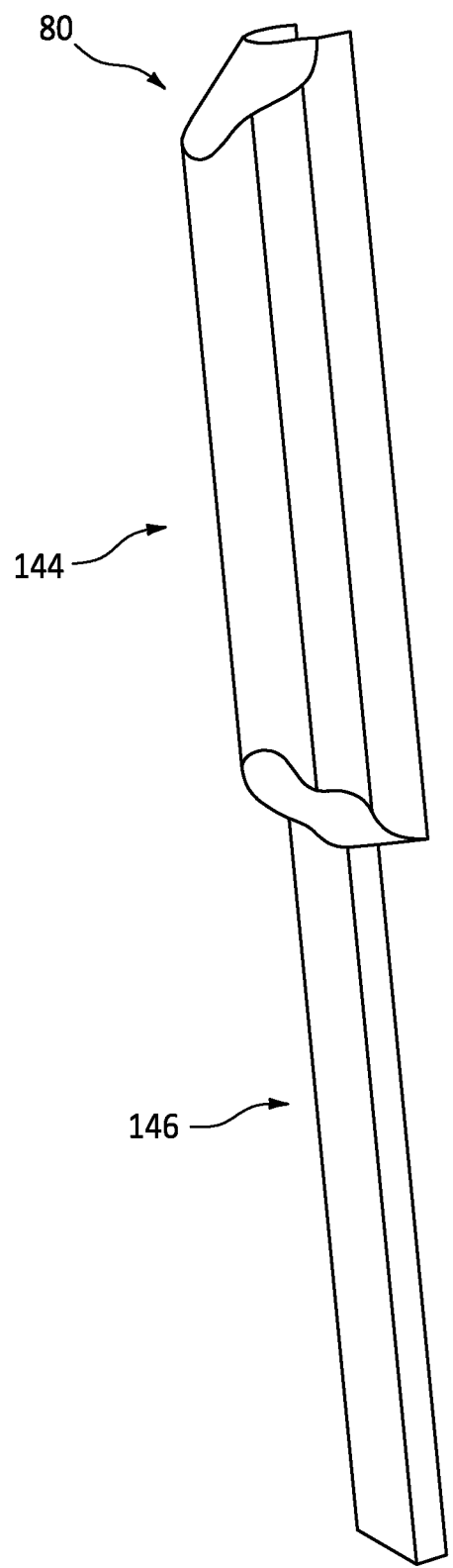
FIG. 14 is a perspective illustration of the artificial ice configured with different longitudinal sections.

In some embodiments, referring to FIG. 14, the artificial ice 80 may include a plurality of sections 144 and 146 with different geometries. For example, the first (e.g., outer) section 144 may have a larger cross-sectional area and the second (e.g., inner) section 146. This may simulate more ice accumulating on a first (e.g., outer) portion of a component (e.g., the inlet vane) than a second (e.g., inner) portion of the component, or vice versa.

The artificial ice 80 may be configured for ingestion by the turbine engine 22. The artificial ice 80, for example, may be constructed from the brittle and/or the rigid material and/or include the fracture feature(s) 142. Thus, if the artificial ice 80 were to become dislodged from the respective inlet vane 52 during turbine engine operation, the artificial ice 80 may readily easily break up into many small pieces that can travel into, through and/or be expelled from the turbine engine 22 without, for example, causing any (or any significant) damage to the turbine engine 22. Engine performance may thereby also be tested/monitored in the case of ice ingestion.

The artificial ice 80 may be configured with various turbine engines other than the one described above. The artificial ice 80, for example, may be configured with a geared turbine engine where a gear train connects one or more shafts to one or more rotors in a fan section, a compressor section and/or any other engine section. Alternatively, the artificial ice 80 may be configured with a turbine engine configured without a gear train; e.g., a direct drive engine. The artificial ice 80 may be configured with a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The present disclosure therefore is not limited to any particular types or configurations of turbine engines. The present disclosure is also not limited to turbine engines for aircraft propulsion systems. For example, the turbine engine may alternatively be configured as an auxiliary power unit (APU).

The artificial ice 80 and the method 500 are describes with respect for simulating and/or monitoring effects of ice accumulation on the leading edges 58 of the inlet vanes 52 of the turbine engine 22. However, the artificial ice 80 and the method 500 may also be used for simulating and/or monitoring effects of ice accumulation on a leading edge or end of another aircraft propulsion system component (e.g., a nacelle inlet lip, nose cone tip, etc.) or a ledging edge or end of another aircraft component (e.g., a wing, etc.). The present disclosure therefore is not limited to inlet structure nor aircraft propulsion system applications.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
    an aircraft propulsion system component comprising a leading edge; and
    artificial ice attached to the aircraft propulsion system component, the artificial ice at least partially covering and extending longitudinally along the leading edge.

2. The assembly of claim 1, further comprising:
    an inlet structure to a turbine engine of the aircraft propulsion system;
    the inlet structure comprising a plurality of inlet vanes; and
    the aircraft propulsion system component comprising a first of the plurality of inlet vanes.

3. The assembly of claim 1, wherein the artificial ice is attached to the aircraft propulsion system component with tape.

4. The assembly of claim 3, wherein
    the tape includes an intermediate portion between a first end portion and a second end portion;
    the intermediate portion extends about and is adhered to an exterior surface of the artificial ice;
    the first end portion extends along and is adhered to a first side surface of the aircraft propulsion system component; and
    the second end portion extends along and is adhered to a second side surface of the aircraft propulsion system component.

5. The assembly of claim 1, wherein the artificial ice directly contacts the aircraft propulsion system component.

6. The assembly of claim 1, wherein the artificial ice is configured with a hollow body.

7. The assembly of claim 1, wherein
    the artificial ice includes an outer shell and a support;
    the outer shell forms an internal cavity within the artificial ice; and the support projects across the internal cavity between opposing sides of the outer shell.

8. The assembly of claim 1, wherein the artificial ice comprises a fracture feature.

9. The assembly of claim 1, wherein
the artificial ice includes a base, a first side leg and a second side leg;
the base is laterally between the first side leg and the second side leg, and the base extends longitudinally along and covers the leading edge;
the first side leg projects out from the base along and covers a first side surface of the aircraft propulsion system component; and
the second side leg projects out from the base along and covers a second side surface of the aircraft propulsion system component.

10. The assembly of claim 9, wherein
the artificial ice comprises an interior surface that extends along the base, the first side leg and the second side leg; and
at least a portion of the interior surface engages the leading edge.

11. The assembly of claim 9, wherein
the artificial ice comprises an interior surface that extends along the base, the first side leg and the second side leg; and
at least a portion of the interior surface is disengaged from the leading edge.

12. The assembly of claim 1, wherein at least a portion of an exterior surface of the artificial ice has a curved, convex cross-sectional geometry as the portion of the exterior surface wraps about the aircraft propulsion system component from a first trailing edge of the artificial ice to a second trailing edge of the artificial ice.

13. The assembly of claim 1, wherein
at least a portion of an exterior surface of the artificial ice has a cross-sectional geometry as the portion of the exterior surface wraps about the aircraft propulsion system component from a first trailing edge of the artificial ice to a second trailing edge of the artificial ice; and
the cross-sectional geometry includes a concave section and a convex section.

14. The assembly of claim 1, wherein
the artificial ice has a cross-sectional geometry; and
the cross-sectional geometry changes as the artificial ice extends longitudinally along the leading edge.

15. The assembly of claim 1, wherein the artificial ice comprises at least one of brittle and rigid material.

16. The assembly of claim 1, wherein
the artificial ice extends longitudinally along the leading edge between a first end of the artificial ice and a second end of the artificial ice; and
a portion of the artificial ice tapers inward to the aircraft propulsion system component as the portion of the artificial ice extends longitudinally along the leading edge to the first end of the artificial ice.

17. An assembly for an aircraft, comprising:
an aircraft component comprising a leading edge; and
artificial ice attached to the aircraft component with single sided tape, the artificial ice at least partially covering and extending longitudinally along the leading edge, and the artificial ice between a first portion of the single sided tape and the aircraft component.

18. A method involving an aircraft propulsion system, comprising:
attaching artificial ice to a component of the aircraft propulsion system, the artificial ice at least partially covering and extending longitudinally along a leading edge of the component of the aircraft propulsion system; and
monitoring one or more operational parameters of the aircraft propulsion system while the artificial ice is attached to the component of the aircraft propulsion system.

19. The assembly of claim 17, wherein
the single sided tape further includes a second portion and a third portion;
the first portion is between the second portion and the third portion, and the first portion is adhered to an exterior surface of the artificial ice;
the second portion is adhered to a first side surface of the aircraft component; and
the third portion is adhered to a second side surface of the aircraft component.

20. The assembly of claim 17, wherein the artificial ice is configured with a hollow body.

* * * * *